Patented May 7, 1929.

1,712,250

UNITED STATES PATENT OFFICE.

MERLE B. CHENEY, OF CLEVELAND, OHIO, ASSIGNOR TO THE CHENEY CHEMICAL COMPANY, OF CLEVELAND, OHIO, A CORPORATION OF OHIO.

ANÆSTHETIC GAS AND METHOD OF MAKING SAME.

No Drawing. Application filed October 29, 1925. Serial No. 65,683.

The present invention, relating, as indicated, to an anæsthetic gas and the method of making same, is particularly directed to an improved mixture of anæsthetic gases which shall have the desirable property of freely flowing from a tank or container where the gas is held under pressure without freezing, as is the case with most of the gaseous anæsthetics now in use. A further object of the invention is the provision of a gaseous mixture, whether for anæsthetic or for other purposes, which shall be free flowing and not subject to freezing upon discharge from a container under pressure. To the accomplishment of the foregoing and related ends, said invention, then, consists of the means hereinafter fully described and particularly pointed out in the claims.

The following description sets forth in detail one method and one product exemplifying my invention, such disclosed procedure and product constituting, however, but one of various applications of the principle of my invention.

Ethylene gas, which is at present widely used for an anæsthetic, is ordinarily stored in containers under pressure of some 1400 pounds per square inch and is used by discharging the gas from these containers and then after discharge mixing it, if desired, with small amounts of ether to increase the anæsthetizing properties and to permit muscular relaxation by the patient. One difficulty in the use of ethylene, as with all other gases stored under high pressure and then discharged at low pressure, is that the expansion of the gas during discharge immensely lowers the temperature and causes freezing of any moisture which is present at the point of discharge, even though the gas has been dried and the greater part of the moisture removed, many times so clogging the discharge opening that further flow is entirely prevented.

The present invention is based on my discovery that certain liquids, such for example as ether, may be mixed with ethylene before or after compression of the latter and that at a pressure of 1400 pounds the liquid ether is completely vaporized and remains in this condition in the container. It is based upon the further discovery that ethylene containing a small amount of vaporized ether flows freely from a container without any of the objectionable freezing above noted, due to the low freezing point of the ether and to its relatively high absorption for water, and to the lowered freezing point of the mixture of ether and water. In making use of this discovery and in carrying out the present method I mix a small quantity of liquid ether with ethylene gas and then compress this mixture to a very high degree, such as 1400 pounds, when the mixture, which is now entirely gaseous, is stored in suitable containers. The ethylene may, if desired, be charged directly into a container in which the ether has already been supplied, but I find it more convenient to mix the liquid ether with the ethylene before compression and filling into the container.

A small amount of ether is sufficient to make the ethylene flow freely, and at normal temperatures an amount from one half of one per cent to five per cent by volume of ether is sufficient, although at different temperatures other amounts may be employed. If the ethylene is stored at low pressure amounts of ether up to 25 per cent, or even 30 per cent, by volume of the quantity of the ethylene used may be employed, due to the solubility of ethylene for ether being very much higher at low pressures than at such pressures as 1400 pounds.

The advantage of the present method and use of the present mixture of gases for anæsthetic use are, first, that the gas is free flowing and will not freeze, and that greater anæsthetic properties are secured from the above mixture than are possible by the use of ethylene gas alone. In addition to this advantage the use of ether masks the odor of the ethylene and the use of the present mixture permits the use of higher percentages of oxygen during anæsthesia. It is customary at present to mix ether with ethylene after the discharge of the ethylene from the container, but this method is uncertain because the proportions of ether and ethylene cannot be maintained, and also because of the danger of the supply of ethylene failing entirely, due to the freezing at the point of discharge. Both of these difficulties are entirely avoided by the use of the present mixture.

The present method may be advantageously applied to any ethylene of satisfactory purity, but preferably on ethylene of which the moisture content has been reduced to a minimum by usual methods of dehydration.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. A gaseous mixture for anæsthetic purposes comprising relatively pure ethylene gas containing vaporized ether in an amount less than one third the volume of the ethylene, such mixture being under a pressure in excess of 1000 pounds per square inch.

2. A gaseous mixture for anæsthetic purposes comprising 100 parts by volume of relatively pure ethylene gas and from one-half of one part to five parts of vaporized ether under a pressure in excess of 1000 pounds per square inch.

3. A gaseous mixture for anæsthetic purposes comprising 100 parts by volume of relatively pure ethylene gas and from one-half of one part to five parts of vaporized ether under a pressure of approximately 1400 pounds per square inch.

4. In a method of preparing a gaseous mixture for anæsthetic purposes, the steps which consist in adding to ethylene gas not to exceed 25 per cent by volume of liquid ether and then compressing such mixture.

5. In a method of preparing a gaseous mixture for anæsthetic purposes, the steps which consist in adding to a gas capable of producing anæsthesia not to exceed 25 per cent by volume of liquid ether and then compressing such mixture to a pressure of at least 1000 pounds per square inch.

6. In a method of preparing a gaseous mixture for anæsthetic purposes, the steps which consist in adding to ethylene gas not to exceed 5 per cent by volume of liquid ether, and then compressing such mixture to a pressure of at least 1000 pounds per square inch.

7. In a method of preventing freezing of highly compressed gases when discharging through a restricted opening with consequent expansion and lowering of the temperature, the step which consists in maintaining said highly compressed gas in intimate intermixture upon discharge with a fluid of low freezing point and relatively high absorption for moisture.

8. In a method of preventing freezing of highly compressed gases when discharging through a restricted opening with consequent expansion and lowering of the temperature, the step which consists in maintaining said highly compressed gas in intimate intermixture upon discharge with vaporized ether.

Signed by me, this 23rd day of October, 1925.

MERLE B. CHENEY.